United States Patent

[11] 3,629,756

| [72] | Inventor | Herman Holtz |
| | | 62 Wieshaden Postfach 167 |
| | | Postscheckkonto, Frankfurt, Germany |
| [21] | Appl. No. | 21,888 |
| [22] | Filed | Mar. 23, 1970 |
| [45] | Patented | Dec. 21, 1971 |

[54] THIN SHEET MAGNET
5 Claims, 3 Drawing Figs.

[52] U.S. Cl.................................................. 335/285, 335/303
[51] Int. Cl................................................... H01f 7/20
[50] Field of Search.......................................... 335/285, 302, 303, 306

[56] References Cited
FOREIGN PATENTS
950,273  2/1964  Great Britain................. 335/303

Primary Examiner—G. Harris
Attorney—Meyer, Tilberry & Body

ABSTRACT: A thin sheet magnet comprised of a thin soft iron foil base with a magnetized barium-ferrite dispersion on one or both sides for use as a wall covering to provide direct mounting means for pictures and the like containing a thin foil backing or as an intermediary between a wall and a picture or the like.

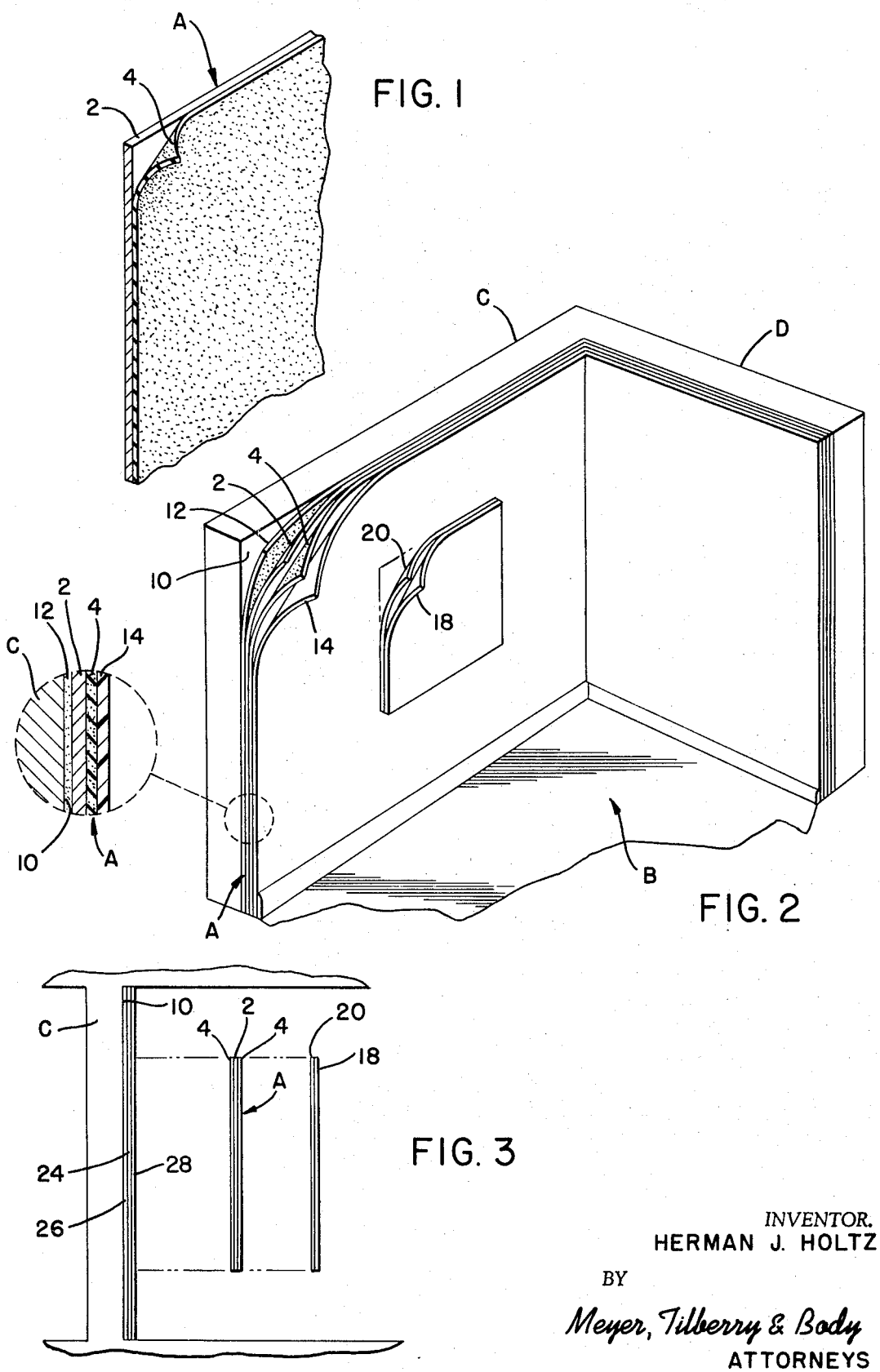

THIN SHEET MAGNET

This application pertains to the art of permanent magnets, and more particularly, to permanent thin sheet magnets.

The invention is particularly applicable for use as a wall covering or as an intermediate means between a sheet iron wall covering and any item desired to be attached thereto. However, it will be appreciated that the invention has further applications which will be apparent to those skilled in the art.

In general, permanent sheet surface magnets have been well known in the art, but heretofore these magnets have only been produced by calendering flexible plastic materials containing barium-ferrite into flat sheets. These sheets were necessarily thick in order to attain the necessary magnetic strength as well as to give the sheet mechanical strength. Such thickness greatly increased the weight per unit area of the magnets. This type of magnet has so far proved unsatisfactory for use as a wall or extended area covering means, particularly for vertical area coverage, because of this weight and the costs of manufacturing therein involved.

The present invention contemplates a new permanent thin sheet magnet and method for making same, which magnet and method overcome the above-mentioned problems and other problems associated with prior sheet-type surface magnets. Additionally, the present invention provides a thin sheet magnet and method for making same which permits easy storing and handling and multiplicity of use.

In accordance with one aspect of the present invention, a permanent thin sheet magnet for use as a wall covering or the like is provided which is comprised of a thin iron foil base with a thin coating of a barium-ferrite dispersion on one or both sides, which barium-ferrite has been magnetized following application. As used hereinafter, thin, as it is applied to the foil, means a thickness ranging generally from 0.001 to 0.003 of an inch and of such characteristics that it may be rolled up with an inside diameter of approximately two inches and unrolled with no permanent deformation being present. The barium-ferrite coating may be from 0.0005 to 0.02 of an inch in thickness.

In accordance with another aspect of the present invention, a method of manufacturing thin sheet surface magnets is provided, which method comprises the steps of dispersing barium-ferrite in a flexible plastic material with a solvent and a softener, pressing or silk-screening the dispersion onto a thin soft iron foil, and magnetizing the dispersion.

The principal object of the present invention is to provide a permanent thin sheet magnet and method for manufacturing same for use as a wall covering in buildings and the like.

An additional object is to provide a permanent thin sheet magnet and method for manufacturing same which is magnetized on one side only while the other side contains an adhesive to fasten the magnet into a desired position Another object of the invention is to provide a permanent thin sheet magnet and method for manufacturing same which may be rolled up for convenient storage in order to reduce required storage space and facilitate ease of handling.

A still further object is to provide a permanent thin sheet magnet and method for manufacturing same which may be used as an intermediary between two magnetic surfaces so as to maintain those two surfaces in a desired relationship.

The invention may take physical form in certain parts and arrangements of parts, a preferred embodiment of which will be described in detail in this specification and illustrated in the accompanying drawings which form a part hereof and wherein:

FIG. 1 is a perspective view of a permanent thin sheet magnet;

FIG. 2 is a perspective view of an application of the magnet of FIG. 1; and,

FIG. 3 is an exploded end view of a second application of the magnet shown in FIG. 1 as applied to the wall of FIG. 2.

Referring now to the drawings wherein the FIGS. are for the purpose of illustrating the preferred embodiment of the invention only and not for the purpose of limiting same, FIG. 1 shows a permanent thin sheet surface magnet A comprised of a thin magnetically permeable iron foil base 2 and magnetized barium-ferrite dispersion 4. The corner of dispersion has been turned away from base 2 for illustrative purposes only.

In accordance with the illustrated embodiment of the invention, thin magnetically soft iron foil is utilized as a base 2, such as for example, an annealed steel strip from 0.001 to 0.003 of an inch in thickness in any convenient length and width. The thickness of foil 2 is of primary importance since the very thin foil reduces the per area weight and allows the sheet magnet to be rolled up for storage purposes. Depending on the specific physical qualities of foil base 2, it may be rolled such that the inside diameter of the roll is about two inches and at unrolling, no adverse effects, such as bending or deformation, are present. Further, the reduced weight provides for practical application.

Barium-ferrite dispersion 4 contains essentially 90 percent barium-ferrite and 90 percent synthetic plastic material. To make the dispersion, barium-ferrite is dispersed in a suitable synthetic with a solvent and a softener in the suggested proportions. A suggested synthetic is chlorinated polyethylene and a suitable solvent is TOLUOL. The solvent is added in such a quantity until the degree of viscosity desired is attained. If barium-ferrite dispersion 4 is viscous, it may be applied to base 2 by pressing the dispersion onto the foil in a continuous process. Additional solvent may be added to reduce the viscosity of the dispersion such that a silk-screen process may be utilized for application. The number of times the silk-screen process is repeated is determinative of the thickness of the dispersion in this instance. Either of these two methods will permit the application of barium-ferrite dispersion 4 to a desired thickness of generally between 0.0005 to 0.02 of an inch on either one or both sides of base 2. Once dispersion 4 has been applied to base 2, it may be magnetized by any suitable method, such as for example, bringing a serpentine conductor into proximity with the barium-ferrite surface and applying a short pulse of heavy electrical current through the conductor. This magnetization process forms a permanent magnetic surface comprised of closely spaced alternating magnetic poles. The use of the thin foil base makes possible the use of relatively thin coatings of barium-ferrite while still obtaining satisfactory magnetic strength because the return flux between poles is in foil base 2. The thickness of dispersion 4 will in no way adversely affect the desired characteristic of the magnet A to be rolled up for storage purposes as hereinabove discussed.

An application of permanent thin sheet magnet A is demonstrated in FIG. 2 wherein there is a room generally designated B with sidewalls C and D on which it is desired to mount pictures, charts of the like. Each wall C and D has a generally flat inner surface 10. For this type of application, thin iron foil base 2 is coated on one side only with the barium-ferrite dispersion 4. The other side of base 2 is coated with an adhesive substance 12, such as for example, a thermo-adhesive which is completely dry in a cold state. A thin decorative covering 14 may be laminated over barium-ferrite dispersion 4 to enhance the looks of that portion of magnet A which will be exposed. The above-described embodiment is then mounted to side wall 10 wherein, as shown in FIG. 2, the thin wall covering depicted is comprised of adhesive 12, thin soft iron foil base 2, barium-ferrite dispersion 4 and decorative covering 14. A picture or the like 18, with foil backing 20 may then be easily mounted at any desired position relative to surface 10 by placing it against thin sheet magnet A as attached to surface 10. Depending on the nature of adhesive 12, permanent thin sheet magnet A may, itself, be removed for use on other wall areas. Picture or the like 18 may be moved to any position on surface 10 merely by removing it from its initial position and replacing it where desired.

The embodiment of FIG. 2 has useful applications, particularly within business offices, where charts and diagrams corresponding to 18 in FIG. 2 receive daily usage. As each chart 18 is needed, it may be easily attached to wall surface 10 by the interaction between permanent thin sheet magnet A and thin foil 20 on the back of each chart 18. If the charts are not required, they may be rolled up and conveniently stored, the thin foil backing 20 not causing interference therewith, similar to the rolling up of magnet A itself.

A second embodiment of thin sheet magnet A is depicted in FIG. 3. In FIG. 3, sidewall C, with flat inner surface 10, receives thin iron foil covering 24 containing adhesive coating 26 on the wall side and decorative covering 28 on the exposed side. A picture or the like 18 has iron foil backing 20 as in FIG. 2. The permanent thin sheet magnet A of FIG. 3 which has been coated with barium-ferrite dispersion 4 and magnetized on both sides, acts as a mounting intermediary. It may be moved as desired and reused for subsequent mounting applications with other pictures or the like 18.

Although the invention has been described with reference to specific embodiments and advantages, variations thereto will be known to those skilled in the art.

Having thus described my invention, I claim:

1. A thin flexible sheet magnet for use as a wall covering or the like which comprises:
a base of thin magnetically soft iron foil and a barium-ferrite dispersion on at least one side of said foil, said dispersion being magnetized to form closely spaced alternating oppositely charged magnetic poles.

2. The permanent sheet magnet of claim 1 wherein said dispersion generally contains 90 percent barium-ferrite and 10 percent synthetic plastic material.

3. The permanent sheet magnet of claim 1 wherein said foil is generally from 0.001 to 0.003 of an inch in thickness.

4. The permanent sheet magnet of claim 1 wherein said dispersion is generally between 0.005 to 0.02 of an inch in thickness.

5. The thin sheet magnet as defined in claim 1 wherein said foil contains said dispersion on both sides.

* * * * *